US006981486B2

(12) United States Patent
Yone et al.

(10) Patent No.: US 6,981,486 B2
(45) Date of Patent: Jan. 3, 2006

(54) VEHICULAR ACCELERATOR PEDAL DEVICE

(75) Inventors: Shinichi Yone, Wako (JP); Youichi Sugimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/940,580

(22) Filed: Sep. 14, 2004

(65) Prior Publication Data

US 2005/0056253 A1 Mar. 17, 2005

(30) Foreign Application Priority Data

Sep. 17, 2003 (JP) ............................ 2003-324506

(51) Int. Cl.
*F02D 11/04* (2006.01)
*B60K 26/02* (2006.01)

(52) U.S. Cl. .......................... 123/399; 74/513; 701/70

(58) Field of Classification Search ................ 123/361, 123/399; 74/512, 513; 701/70
See application file for complete search history.

(56) References Cited

U.S. PATENT DOCUMENTS

| | | | | |
|---|---|---|---|---|
| 5,007,516 | A * | 4/1991 | Miyazaki | 192/72 |
| 5,215,057 | A * | 6/1993 | Sato et al. | 123/399 |
| 5,485,892 | A * | 1/1996 | Fujita | 701/70 |
| 6,542,793 | B2 * | 4/2003 | Kojima et al. | 701/1 |
| 6,882,915 | B2 * | 4/2005 | Yamamura et al. | 701/45 |
| 6,920,385 | B2 * | 7/2005 | Egami | 701/70 |
| 2003/0176960 | A1 * | 9/2003 | Yamamura | 701/36 |
| 2003/0190996 | A1 * | 10/2003 | Yone | 477/120 |
| 2003/0233902 | A1 * | 12/2003 | Hijikata et al. | 74/513 |
| 2003/0236608 | A1 * | 12/2003 | Egami | 701/70 |
| 2004/0059482 | A1 * | 3/2004 | Hijikata | 701/36 |

FOREIGN PATENT DOCUMENTS

JP 2001-105926 4/2001

* cited by examiner

*Primary Examiner*—Tony M. Argenbright
(74) *Attorney, Agent, or Firm*—Rankin, Hill, Porter & Clark LLP

(57) ABSTRACT

Vehicular accelerator pedal device includes: a depression amount detection section for detecting an amount of depression, by a human operator, of an accelerator pedal and generating a depression amount signal; a throttle control section for controlling a throttle opening based upon the depression amount signal; a pedal reaction impartment section for imparting the accelerator pedal with a reaction force in accordance with the amount of depression; and a pedal reaction control section for, when operation has been performed for returning the pedal from a depressed position, controlling the reaction force based upon the amount of depression of the accelerator pedal.

3 Claims, 5 Drawing Sheets

VEHICULAR ACCELERATOR PEDAL DEVICE

FIELD OF THE INVENTION

The present invention relates to a vehicular accelerator pedal device designed to accurately adjust generation timing of a predetermined pedal reaction force to timing of a desired throttle opening, so as to permit accurate agreement between transmission kickdown and pedal reaction force generation.

BACKGROUND OF THE INVENTION

Levers, pedals, etc. in various automotive and other types of vehicles are input devices operable by human operators or drivers, and, generally, as any one of these input devices is operated by the driver, a certain reaction force is imparted to a hand or foot of the driver through the input device. There has been known a technique that positively generates such a reaction force in response to driver's operation of the lever or pedal, i.e. that allows the lever or pedal to function not only as an input device but also as an output device. Devices using such a technique are called "haptic devices", one example of which is known from Japanese Patent Laid-Open Publication No. 2001-105926 (JP-A-2001-105926) disclosing a vehicular operation apparatus provided with a haptic device.

FIG. 5 shows the vehicular operation apparatus disclosed in the above-mentioned No. 2001-105926 publication. This vehicular operation apparatus includes a pedal 101 connected via an actuator shaft 102 to a stroke simulator 103. With a stroke sensor 104 provided on the actuator shaft 102, the stroke simulator 103 generates and imparts a reaction force to the pedal 101 in accordance with a stroke of the pedal 101. The stroke sensor 104 is operatively connected via an ECU 105 to a throttle device 106, and the ECU 105 supplies the throttle device 106 with an instruction signal such that the throttle opening is varied in accordance with a detected pedal stroke.

In order to allow kickdown of an automatic transmission to be performed in the vehicle by the driver stepping on or depressing the pedal 101 rapidly and deeply for rapid acceleration, there may be provided a kickdown switch 109 rearwardly of the pedal 101 for generating a kickdown signal. Namely, once the pedal 101 is depressed to a predetermined stroke position, the kickdown switch 109 is turned on to generate an ON signal, and the instructed kickdown of the automatic transmission is executed in response to the ON signal from the switch 109.

With the conventional devices using the haptic technique, however, the driver would feel uncomfortable when returning the pedal 10 from a depressed position in a predetermined reaction-force increasing control region where control is performed to increase the pedal reaction force in accordance with increase in the depression amount of the pedal, because the stroke simulator 103 generates the pedal reaction force in accordance with a stroke of the pedal.

SUMMARY OF THE INVENTION

In view of the foregoing prior art problems, it is an object of the present invention to provide an improved vehicular accelerator pedal device which can significantly reduce an uncomfortable feeling of a human driver when returning the accelerator pedal from a depressed position in a predetermined reaction-force increasing control region.

In order to accomplish the above-mentioned object, the present invention provides an improved vehicular accelerator pedal device, which comprises: a depression amount detection section for detecting an amount of depression, by a human operator, of an accelerator pedal and generating a depression amount signal indicative of the detected amount of depression; a throttle control section for controlling a throttle opening on the basis of the depression amount signal; a pedal reaction impartment section for imparting the accelerator pedal with a reaction force on the basis of the amount of depression of the accelerator pedal; and a pedal reaction control section for, when operation has been performed by a human operator for returning the accelerator pedal from a depressed position, controlling the reaction force to be imparted to the accelerator pedal on the basis of the amount of depression of the accelerator pedal.

With the arrangement that, when the accelerator pedal is being returned from a depressed position, the pedal reaction control section controls the reaction force on the basis of the amount of depression of the accelerator pedal and irrespective of the traveling state of the vehicle, the reaction force does not vary greatly while the accelerator pedal is in the returning stroke; the arrangement can thus significantly reduce an uncomfortable feeling of the driver when returning the accelerator pedal from a depressed position in the reaction-force increasing control region.

Preferably, when the accelerator pedal is being returned from a depressed position, the pedal reaction control section controls the reaction force to be imparted in such a manner that the reaction force varies by a substantially uniform amount relative to variation in the amount of depression of the accelerator pedal. Thus, it is possible to reduce the uncomfortable feeling of the driver even more effectively when returning the accelerator pedal from a depressed position in the reaction-force increasing control region.

In a preferred embodiment, when operation has been performed for returning the accelerator pedal from a depressed position in a predetermined reaction-force increasing control region where control is performed to increase the pedal reaction force in accordance with increase in the depression amount of the pedal, the pedal reaction control section controls the reaction force to be imparted in accordance with a predetermined map such that the reaction force to be imparted varies in proportional relation to the depression amount of the accelerator pedal or varies relative to the depression amount of the accelerator pedal only within a predetermined variation range (or width) smaller than a predetermined value. Thus, it is possible to reduce the uncomfortable feeling of the driver even more effectively when returning the accelerator pedal from a depressed position in the reaction-force increasing control region.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
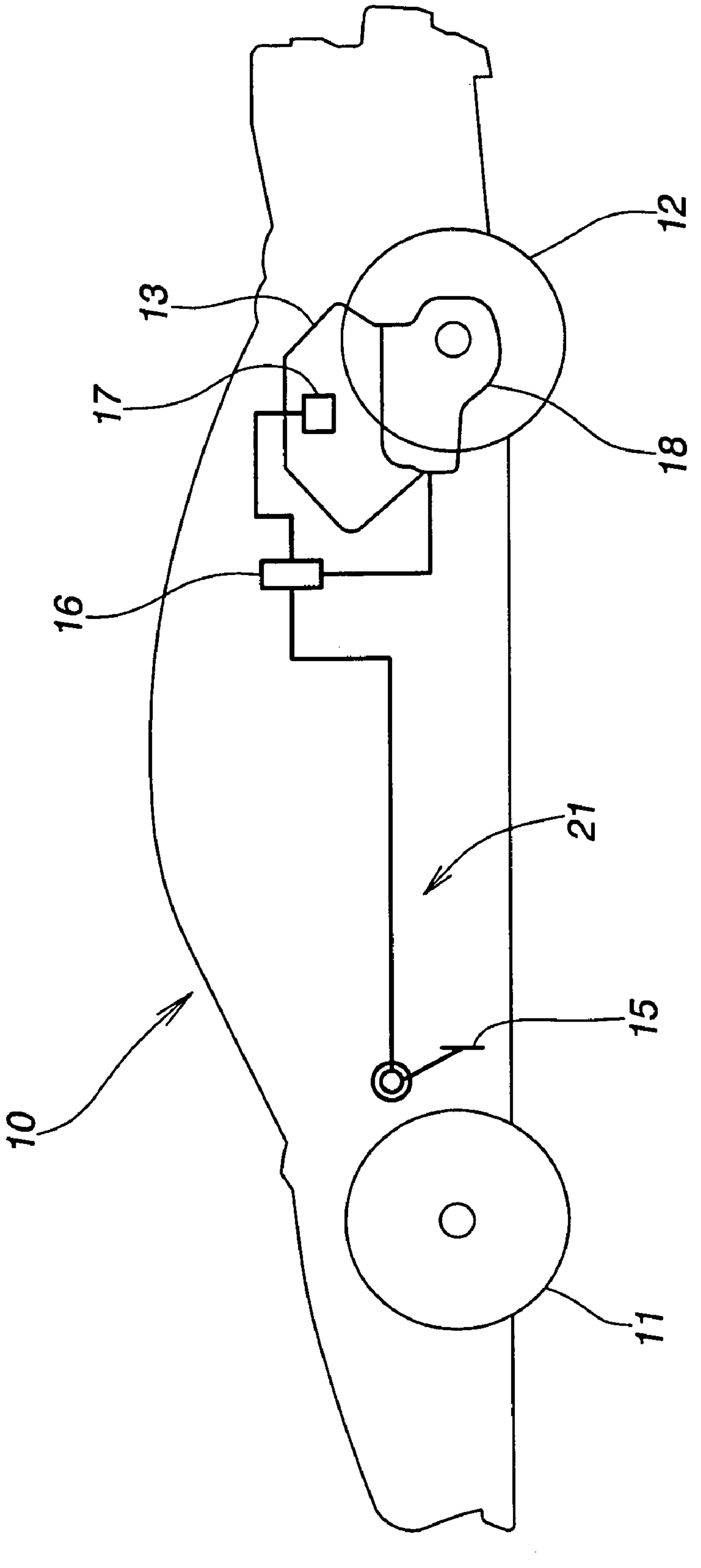
FIG. 1 is a schematic view of a vehicle employing an accelerator pedal device of the present invention.

FIG. 1 is a schematic view of a vehicle, such as an automotive vehicle, employing an accelerator pedal device of the present invention. The vehicle 10 is of the mid-ship type where an engine 13 is located between front and rear road wheels 11 and 12 closer to the rear road wheel 12. By manipulation of an accelerator pedal 15 that is disposed underneath a front portion of a driver's seat, an opening of a not-shown throttle valve (i.e., throttle valve opening) in a throttle body 17, provided on an upper portion of the engine 13 via an engine control unit (hereinafter referred to simply as an "ECU") 16, can be varied to control an output of the engine 13. The manipulation of the accelerator pedal 15 can also control speed-changing operation of an automatic transmission 18 on the basis of an instruction from the ECU 16.

Generally, the accelerator pedal and the throttle valve are mechanically interconnected via a throttle cable or otherwise. However, the vehicle 10 of FIG. 1 employs the so-called DBW (Drive By Wire) construction where the accelerator pedal 15 and the throttle body 17 (specifically, throttle valve section provided in the body 17 for driving the throttle valve in a manner to be detailed later) are interconnected through electric wiring.

With the DBW or electric wiring drive construction, the throttle valve can be opened/closed very quickly in response to operation, by the human driver or driver, of the accelerator pedal 15, so that the engine output can be controlled with a further enhanced response. Also, electrical signals from the accelerator pedal 15 can be used not only to drive the throttle valve, but also to control the above-mentioned speed-changing operation of the automatic transmission 18 and operation of other components.

The accelerator pedal 15 and ECU 16 are among components constituting the accelerator pedal device 21 of the present invention that will be detailed with reference to FIG. 2.

Figure 2:
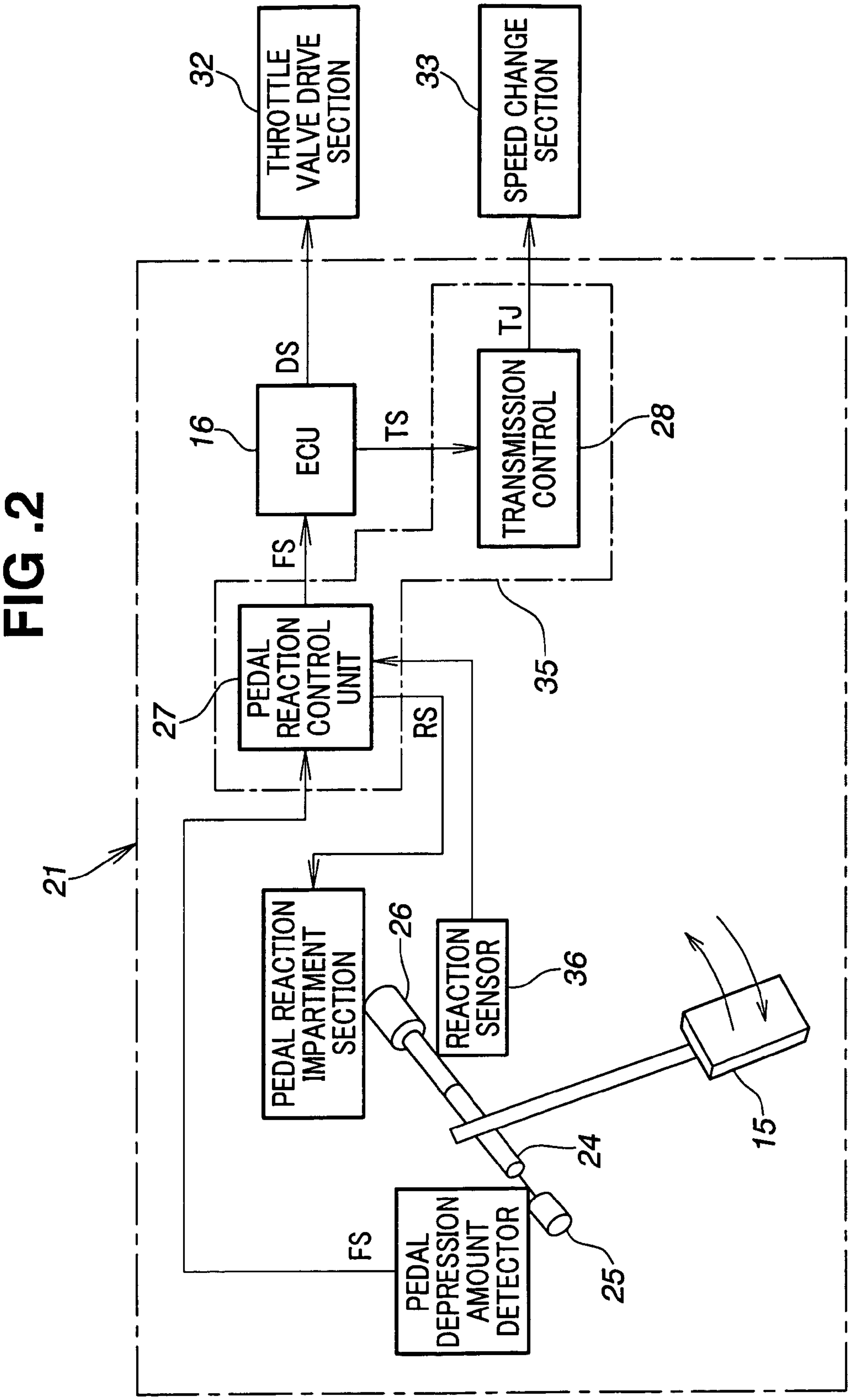
FIG. 2 is a block diagram showing an example general setup of the accelerator pedal device of the present invention.

FIG. 2 is a block diagram showing an example general setup of the accelerator pedal device 21 of the present invention. The accelerator pedal device 21 includes the above-mentioned accelerator pedal 15, and a pedal depression amount detection section 25 connected to one end of a pedal shaft 24, functioning as a pivot shaft of the accelerator pedal 15, for detecting a depression amount of the pedal 15 to generate a signal FS indicative of the detected depression amount of the pedal 15 (depression amount signal FS). The accelerator pedal device 21 also includes a pedal reaction impartment section 26 connected to the other end of the pedal shaft 24, and, on the basis of the pedal depression amount signal FS, the pedal reaction impartment section 26 generates a reaction force to be imparted to the accelerator pedal 15 in accordance with the detected pedal depression amount; the reaction force is opposite in direction to the pedal depression force. The accelerator pedal device 21 also includes a pedal reaction control unit 27 for controlling the reaction force of the accelerator pedal 15 by giving a reaction force signal RS to the pedal reaction impartment section 26. Further, in the accelerator pedal device 21, the above-mentioned ECU 16 functions as a throttle control section that receives the pedal depression amount signal FS from the pedal reaction control unit 27, and a speed change (transmission shift) instruction TS generated by the ECU 16 on the basis of the received pedal depression amount signal FS is passed to a transmission control section 28.

Once the ECU 16 supplies the throttle valve drive section 32 with a drive signal DS based on the pedal depression amount signal FS, the drive section 32 opens or closes the throttle valve to vary the throttle opening. On the basis of the speed change instruction TS, the transmission control section 28 generates and supplies speed change information TJ to a speed change section 33 of the automatic transmission 18 of FIG. 1, in response to which the speed change section 33 executes a desired speed change.

The pedal depression amount detection section 25, which is, for example, in the form of a rotational angle sensor for detecting a rotational angle of the pedal shaft 24, detects a depression amount of the accelerator pedal 15 as a pivot angle of the accelerator pedal 15. The pedal reaction impartment section 26 is, for example, in the form of an electric motor having an output shaft connected to the pedal shaft 24.

On the basis of the depression amount signal FS, the pedal reaction control unit 27 controls a range of depressed positions of the pedal 15 where a reaction force is to be generated and imparted to the pedal 15 and an intensity value (particularly, maximum value) of the pedal reaction force. The pedal reaction control unit 27 and transmission control section 28 together constitute a reaction/transmission control section 35. The pedal shaft 24 is provided with a reaction sensor 36 for detecting the pedal reaction force.

Figure 3:
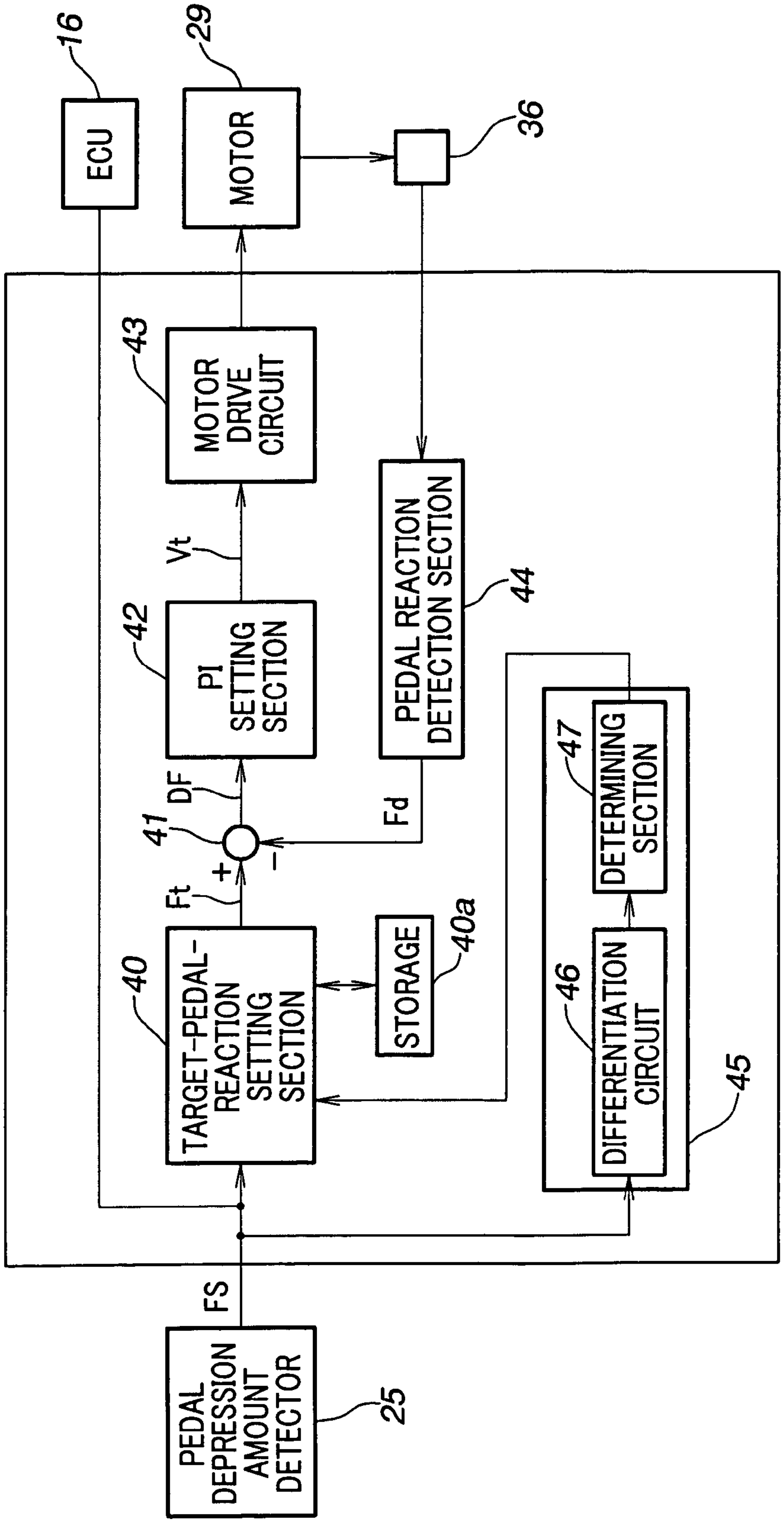
FIG. 3 is a block diagram showing an example setup of a pedal reaction control unit of the accelerator pedal device.

FIG. 3 is a block diagram showing an example setup of the pedal reaction control unit 27, which receives the depression amount signal FS from the pedal depression amount detection section 25 to control the electric motor 29. The pedal reaction control unit 27 includes a target-pedal-reaction setting section 40, an offset calculation section 41, a PI setting section 42, a motor drive circuit 43, a pedal reaction detection section 44, and a pedal depressing/returning operation determination section 45.

The target-pedal-reaction setting section 40 calculates a target pedal reaction force Ft on the basis of the depression amount signal FS from the pedal depression amount detection section 25, and it sends the calculated target pedal reaction force Ft to the offset calculation section 41 and also passes the depression amount signal FS to the ECU 16. Specifically, when the output signal from the pedal depressing/returning operation determination section 45 is indicative of returning (operation) of the accelerator pedal 15 from a depressed position, the target-pedal-reaction setting section 40 outputs a target pedal reaction force Ft on the basis of a target pedal reaction map stored in a storage section **40*a*. Specifically, the target pedal reaction map is prestored in the storage section 40*a*** as a predetermined function of the pedal depression amount Fs, in accordance with which the target pedal reaction force Ft varies in proportional relation to the pedal depression amount Fs or in accordance with which the target pedal reaction force Ft varies relative to the pedal depression amount Fs only within a variation range (or width) smaller than a predetermined value (i.e., variation in the target pedal reaction force Ft relative to the pedal depression amount Fs is limited within the predetermined range).

More specifically, when the output signal from the pedal depressing/returning operation determination section 45 is indicative of the returning operation of the accelerator pedal 15 while the reaction force of the accelerator pedal 15 falls within a predetermined reaction-force increasing control region where control is performed to increase the pedal reaction force in accordance with increase in the depression amount of the pedal, the target-pedal-reaction setting section

40 outputs a given target pedal reaction force Ft on the basis of the target pedal reaction map that defines various values of the target pedal reaction force Ft varying in proportional relation to various possible values of the pedal depression amount Fs or varying relative to the various possible values of the pedal depression amount Fs only within the variation range (or width) smaller than the predetermined value. The offset calculation section 41 calculates a difference or offset DF by subtracting, from the value of the target pedal reaction force Ft output from the setting section 40, the value of the pedal reaction detected by the pedal reaction detection section 44 (i.e., pedal reaction detection value Fd), and it outputs the calculated offset DF to the PI setting section 42. The PI setting section 42 performs a predetermined arithmetic operation using the offset DF to thereby calculate a target voltage Vt such that the pedal reaction detection value Fd follows the target pedal reaction force Ft, and it feeds the thus-calculated target voltage Vt to the motor drive circuit 43. The motor drive circuit 43 generates a motor drive current for driving the motor 29 on the basis of the target voltage Vt fed from the PI setting section 42. The pedal reaction detection section 44 determines the pedal reaction detection value Fd on the basis of an output signal from the reaction sensor 36 that is, for example, in the form of a torque sensor, and it passes the pedal reaction detection value Fd to the offset calculation section 41.

The pedal depressing/returning operation determination section 45 makes a determination, on the basis of the depression amount signal FS from the pedal depression amount detection section 25, as to whether the accelerator pedal 15 is currently in a going state (or stroke) or in a returning state (or stroke), and it outputs a result of the determination to the target-pedal-reaction setting section 40. The pedal depressing/returning operation determination section 45 includes a differentiation circuit 46 and a determining section 47. The differentiation circuit 46 calculates a temporal differentiated value of the depression amount FS detected by the pedal depression amount detection section 25 and passes the calculated temporal differentiated value to the determining section 47. The determining section 47 determines, on the basis of the temporal differentiated value from the differentiation circuit 46, whether the accelerator pedal 15 is currently in the going state or in the returning state, and a result of the determination is given to the target-pedal-reaction setting section 40. If the accelerator pedal 15 is currently in the going state, the pedal depressing/returning operation determination section 45 outputs a signal of a value "0", while, if the accelerator pedal 15 is currently in the returning state, the determination section 45 outputs a signal of a value "1".

The following paragraphs describe behavior of the accelerator pedal device constructed in the above-described manner.

Figure 4:
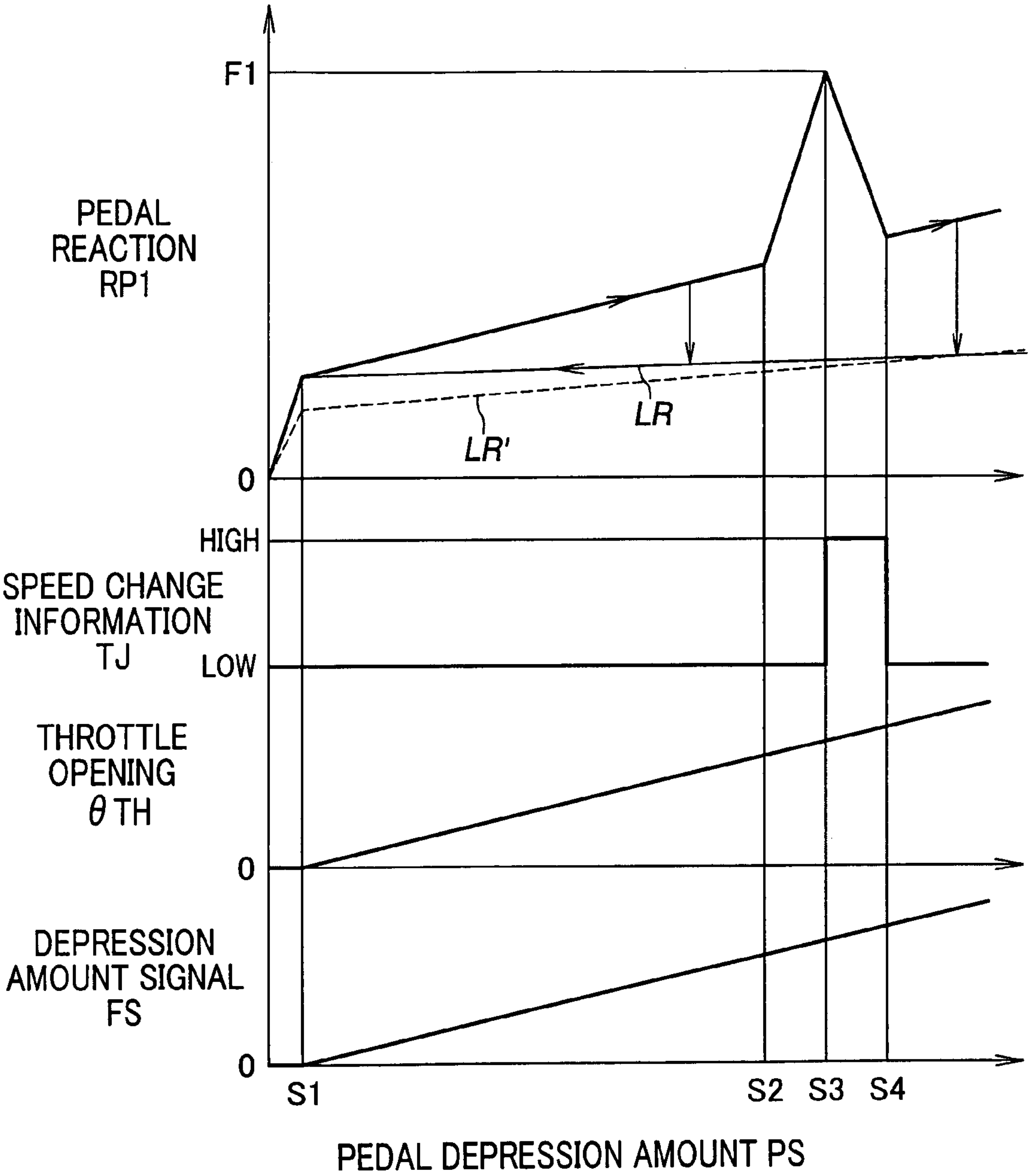
FIG. 4 is a graph explanatory of the behavior of the accelerator pedal device of the present invention.
Figure 5:
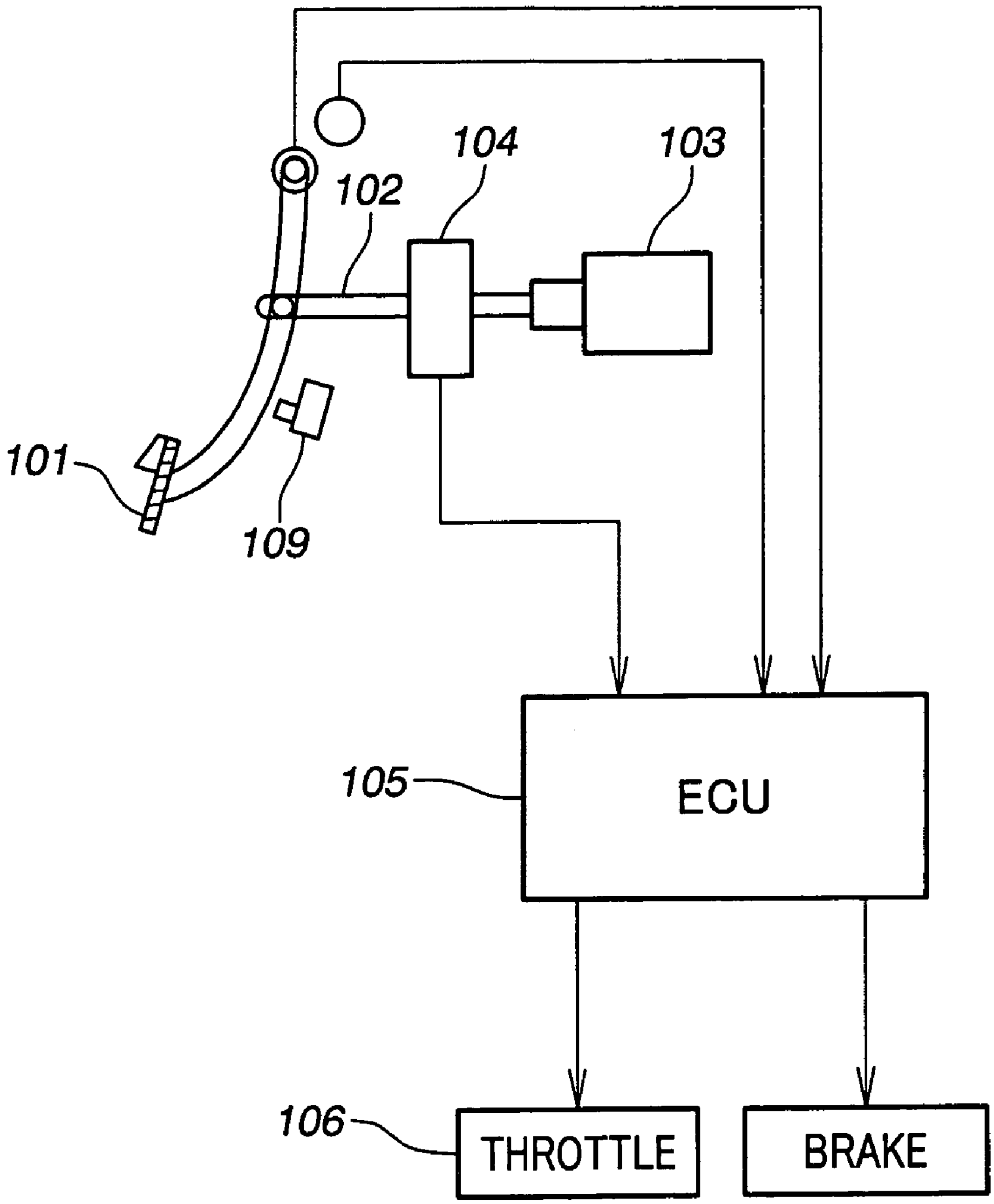
FIG. 5 (PRIOR ART)
FIG. 5 is a block diagram explanatory of a conventional pedal device as a vehicular operator device.

FIG. 4 is a graph explanatory of the behavior of the accelerator pedal device of the present invention. The vertical axis of FIG. 4 represents the depression amount signal FS from the pedal depression amount detection section 25, throttle opening θTH, speed change information TJ from the transmission control section 28 and pedal reaction force RP1 imparted by the motor to the accelerator pedal 15, while the horizontal axis of FIG. 4 represents the depression amount PS of the accelerator pedal 15.

Once the pedal depression amount PS reaches a value S1 as the human operator or driver of the vehicle steps on or depresses the accelerator pedal 15, the depression amount signal FS starts increasing in value, in response to which the throttle opening θTH starts increasing. The throttle opening θTH is an amount that corresponds to (e.g. is proportionally related to) the depression amount FS.

By that time, the value "0" signal indicating that the accelerator pedal 15 is currently in the going state (or stroke) (i.e., going-state indicative signal) has been fed from the depressing/returning operation determination section 45 to the target-pedal-reaction setting section 40. The pedal reaction force RP1 rises sharply as the pedal depression amount PS increases from zero to the value S1, and then it increases progressively in response to increase in the pedal depression amount PS above the value S1.

Then, the pedal reaction force RP1 starts increasing rapidly once the pedal depression amount PS reaches a value S2 and the speed change information TJ rises from a LOW level to a HIGH level once the pedal depression amount PS reaches a greater amount S3, so that a speed change or transmission shift (in this case, "kickdown" operation) is initiated and the pedal reaction force RP1 starts decreasing rapidly. The pedal reaction force RP1 assumes the maximum value F1 when the pedal depression amount PS is at the value S3.

Then, once the pedal depression amount PS reaches a still greater value S4, not only the speed change information TJ falls from the HIGH level to the LOW level, but also the pedal reaction force RP1, which has been decreasing so far, again starts increasing progressively.

If the accelerator pedal 15 is released in this condition, then the depressing/returning operation determination section 45 determines, on the basis of the output signal FS from the pedal depression amount detection section 25, that the accelerator pedal 15 is currently in the returning state (or stroke), and it outputs the value "1" signal (i.e., returning-state indicative signal) to the target-pedal-reaction setting section 40. The target-pedal-reaction setting section 40, having received the value "1" signal, outputs a target pedal reaction force in accordance with the map prestored in the storage section 40*a* as the predetermined function of the pedal depression amount Fs, in accordance with which the target pedal reaction force Ft varies in proportional relation to the pedal depression amount Fs or in accordance with which the target pedal reaction force Ft varies relative to the pedal depression amount Fs only within the variation range (or width) smaller than the predetermined value. Thus, the electric motor 29 is controlled to generate and impart the target pedal reaction force to the accelerator pedal 15. Particularly, when the accelerator pedal has been returned from a depressed position in the predetermined reaction-force increasing control region, the target-pedal-reaction setting section 40 outputs a given target pedal reaction force Ft on the basis of the target pedal reaction map prestored as the above-mentioned function. If the target pedal reaction map prestored in the storage section 40*a* is a map set such that the variation amount of the target pedal reaction force relative to the variation amount of the pedal depression amount is zero, the pedal reaction force RP1 will vary in a manner as indicated by a solid straight line LR in FIG. 4. However, if the target pedal reaction map prestored in the storage section 40*a* is a map set such that the target pedal reaction force Ft varies in proportional relation to the pedal depression amount or varies relative to the pedal depression amount only within the variation range (or width) smaller than the predetermined value, the pedal reaction force RP1 will vary in a manner as indicated by a dotted straight line LR" in FIG. 4.

In the above-described manner, it is possible to significantly reduce an uncomfortable feeling of the driver when returning the accelerator pedal from a depressed position in the reaction-force increasing control region.

Further, whereas the reaction/transmission control section 35 has been described as being provided separately from the ECU 16, it may be included in the ECU 16.

Obviously, various minor changes and modifications of the present invention are possible in the light of the above teaching. It is therefore to be understood that within the scope of the appended claims the invention may be practiced otherwise than as specifically described.

What is claimed is:

1. A vehicular accelerator pedal device comprising:

depression amount detection means for detecting an amount of depression, by a human operator, of an accelerator pedal and generating a depression amount signal indicative of the detected amount of depression;

throttle control means for controlling a throttle opening based upon the depression amount signal;

pedal reaction impartment means for imparting said accelerator pedal with a reaction force based upon the amount of depression of said accelerator pedal; and pedal reaction control means for, when operation has been performed for returning said accelerator pedal from a depressed position, controlling the reaction force to be imparted to said accelerator pedal, based upon the amount of depression of said accelerator pedal.

2. The vehicular accelerator pedal device as claimed in claim 1 wherein, when operation has been performed for returning said accelerator pedal from the depressed position, said pedal reaction control means controls the reaction force to be imparted such that the reaction force varies by a substantially uniform amount relative to variation in the amount of depression of said accelerator pedal.

3. The vehicular accelerator pedal device as claimed in claim 1 wherein, when operation has been performed for returning said accelerator pedal from the depressed position in a predetermined reaction-force increasing control region, said pedal reaction control means controls said reaction force to be imparted in accordance with a predetermined map such that said reaction force to be imparted varies in proportional relation to the depression amount of said accelerator pedal or varies relative to the depression amount of said accelerator pedal only within a predetermined variation range smaller than a predetermined value.

* * * * *